(12) United States Patent
Lee (10) Patent No.: US 8,610,302 B2
(45) Date of Patent: Dec. 17, 2013

(54) WATER WAVE POWER PLANT SYSTEM (76) Inventor: Kye Young Lee, Los Angeles, CA (US)

( * ) Notice: Subject to any disclaimer, the term of this patent is extended or adjusted under 35 U.S.C. 154(b) by 11 days.

(21) Appl. No.: 13/409,670

(22) Filed: Mar. 1, 2012

(65) Prior Publication Data

US 2012/0161445 A1 Jun. 28, 2012

Related U.S. Application Data (63) Continuation-in-part of application No. 12/648,643, filed on Dec. 29, 2009, now Pat. No. 8,324,752.

(51) Int. Cl.
*F03B 13/10* (2006.01)
*F03B 13/12* (2006.01)
*H02P 9/04* (2006.01)

(52) U.S. Cl.
USPC .............................................. 290/53; 290/42

(58) Field of Classification Search
USPC ........................................ 290/53, 54, 42, 43
See application file for complete search history.

(56) References Cited

U.S. PATENT DOCUMENTS

| 7,956,479 | B1 * | 6/2011 | Bergman | 290/53 |
| 8,324,752 | B2 * | 12/2012 | Lee | 290/53 |
| 2010/0045044 | A1 * | 2/2010 | Patterson | 290/53 |

* cited by examiner

*Primary Examiner* — Hae Moon Hyeon
(74) *Attorney, Agent, or Firm* — John K. Park; Park Law Firm (57) ABSTRACT

A water wave power plant system includes a first guide rail, a first clockwise freewheel, a first counterclockwise freewheel, a first buoy queued through the through-hole by the first guide rail, first right and left roller, a first chain belt having engaging the first clockwise freewheel, the first counterclockwise freewheel, the first right roller, and the first left roller on the first plane, and corresponding second set of equivalent elements to tap the water wave energy in an opposite direction. Each of the guide rail includes a rectangular tube, first embedded-rollers installed in the rectangular tube rotatably with two partial portions exposed on two parallel outer wall of the rectangular tube, and second embedded-rollers installed in the first rectangular tube rotatably likewise, wherein the first embedded-rollers and the second embedded-rollers are disposed perpendicularly with respect to each other. A self-propelling ship is constructed using the water wave power plant systems.

16 Claims, 6 Drawing Sheets

WATER WAVE POWER PLANT SYSTEM

RELATED APPLICATION

This application is a continuation-in-part of U.S. patent application Ser. No. 12/648,643 for "WATER WAVE POWER PLANT SYSTEM" filed on Dec. 29, 2009 now U.S. Pat. No. 8,324,752.

BACKGROUND OF THE INVENTION

The present invention relates to a water wave power plant system. More particularly, this invention relates to a water wave power plant system, which taps energy from water wave efficiently.

It is well known that over 70 percent of the surface of Earth is ocean. The ocean meets the landmass along almost endless coastline, and dumps vast energy of wave right there.

Therefore, it would be wonderful if we can secure some of the wave energy for needs of human.

Accordingly, a need for a water wave power plant system has been present for a long time considering the expansive demands in the everyday life of energy. This invention is directed to solve these problems and satisfy the long-felt need.

SUMMARY OF THE INVENTION

The present invention contrives to solve the disadvantages of the prior art.

An object of the invention is to provide a self-propelling ship, which can navigate from a construction dock to a destination by its own power.

Another object of the invention is provide a water wave power plant system.

Still another object of the invention is to provide a water wave power plant system, which taps cheap energy from vertical waves.

Still another object of the invention is to provide a water wave power plant system, which is easy to install or expand.

An aspect of the invention provides water wave power plant system.

The water wave power plant system comprises:

a first guide rail extending vertically;

a first clockwise freewheel disposed at a top position;

a first counterclockwise freewheel disposed at the top position and on a first plane same as the first clockwise freewheel;

a first buoy having a through-hole, wherein the first buoy is queued through the through-hole by the first guide rail and movement of the first buoy is restricted to be along the first guide rail;

a first right roller aligned vertically with the first clockwise freewheel and disposed at a bottom position;

a first left roller aligned vertically with the first counterclockwise freewheel and disposed at the bottom position;

a first chain belt having a first end connected to a top portion of the first buoy and a second end connected to a bottom portion of the first buoy, wherein the first chain belt engages the first clockwise freewheel, the first counterclockwise freewheel, the first right roller, and the first left roller on the first plane;

a second guide rail extending vertically;

a second clockwise freewheel disposed at the top position;

a second counterclockwise freewheel disposed at the top position and on a second plane same as the second clockwise freewheel;

a second buoy having a through-hole, wherein the second buoy is queued through the through-hole by the second guide rail and movement of the second buoy is restricted to be along the second guide rail;

a second right roller aligned vertically with the second clockwise freewheel and disposed at the bottom position;

a second left roller aligned vertically with the second counterclockwise freewheel and disposed at the bottom position;

a second chain belt having a first end connected to a top portion of the second buoy and a second end connected to a bottom portion of the second buoy, wherein the second chain belt engages the second clockwise freewheel, the second counterclockwise freewheel, the second right roller, and the second left roller on the second plane;

a clockwise shaft engaging the first and second clockwise freewheels;

a counterclockwise shaft engaging the first and second counterclockwise freewheels;

a first generator engaging the clockwise shaft; and a second generator engaging the counterclockwise shaft.

The first buoy and the second buoy are disposed on the first chain belt and the second chain belt, such that the first and the second buoy move oppositely from each other by a water wave.

The first guide rail comprises a first rectangular tube, a plurality of first embedded-rollers installed in the first rectangular tube rotatably with two partial portions exposed on first two parallel outer wall of the first rectangular tube, and a plurality of second embedded-rollers installed in the first rectangular tube rotatably with two partial portions exposed on second two parallel outer walls of the first rectangular tube, and the first embedded-rollers and the second embedded-rollers are disposed perpendicularly with respect to each other.

The second guide rail comprises a second rectangular tube, a plurality of third embedded-rollers installed in the second rectangular tube rotatably with two partial portions exposed on first two parallel outer walls of the second rectangular tube, and a plurality of fourth embedded-rollers installed in the second rectangular tube rotatably with two partial portions exposed on second two parallel outer walls of the second rectangular tube, and the third embedded-rollers and the fourth embedded-rollers are disposed perpendicularly with respect to each other.

The first and second embedded-rollers of the first rectangular tube roll on the inner surface of the through-hole and facilitate substantially frictionless movement of the first buoy along the first guide rail.

The third and fourth embedded-rollers of the second rectangular tube roll on the inner surface of the through-hole and facilitate substantially frictionless movement of the second buoy along the second guide rail.

Each of the first and second rectangular tubes may have a square cross-section and the through-hole has a square cross-section.

Each of the first through fourth rollers may engage the corresponding rectangular tube through an axle fixed to two parallel outer walls perpendicular to the two parallel outer walls through which the corresponding embedded-rollers are exposed.

The clockwise freewheels may be configured to engage the corresponding clockwise shaft for a clockwise rotation, and the counterclockwise freewheels may be configured to engage the corresponding counterclockwise shaft for a counterclockwise rotation.

The clockwise freewheels may be configured to disengage the corresponding clockwise shaft for a counterclockwise rotation, and the counterclockwise freewheels may be configured to disengage the corresponding counterclockwise shaft for a clockwise rotation.

Each of the freewheels may comprise a ratchet device.

Each of the freewheels may comprise a plurality of spring-loaded steel rollers inside a driven cylinder.

Each of the first and second buoys may comprise a container for keeping water of a predetermined amount inside.

The predetermined amount may be determined to make the buoy operate in a desired way.

The water wave power plant system may further comprise a stopcock for blocking an opening to the container.

Each of the first guide rail and the second guide rail may have an angular cross-section, such that the corresponding buoy is guided along without rotating around the guide rail.

The angular cross-section may comprise a triangle, a pentagon, a hexagon, and a quadrangle.

The water wave power plant system may further comprise a supporting frame for anchoring the guide rails, the shafts, and the right and left rollers.

The water wave power plant system may further comprise a plurality of bearings for allowing the shafts rotate freely while constrained against the supporting frame.

The water wave power plant system may further comprise a platform fixed to a floor of ocean for installing the supporting frame.

The water wave power plant system may further comprise a floating platform for installing the supporting frame.

The floating platform may comprise a barge, which comprises a water container with a stopcock. Like the buoy, the water container of the barge can be loaded with water to optimize the condition for the operation of the system.

In certain embodiments of the invention, the system may include more buoys and associated other elements for expanding the structure to tap more of the wave energy.

According to another aspect of the invention, a self-propelling ship comprises:

a first boat installed with a plurality of first water wave power plant systems;

a second boat installed with a plurality of second water wave power plant systems;

a connecting deck for covering and connecting the first and second boats with an interval inbetween;

a plurality of propellers powered by electrical power generated by the plurality of first and second water wave power systems; and a plurality of rudders, wherein the self-propelling ship navigates from construction dock to a destination, wherein the destination includes a site for wave power plant.

The advantages of the present invention are: (1) the water wave power plant system has a simple structure to manufacture, install, and maintain; and (2) the water wave power plant system can be expanded to a larger system conveniently.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
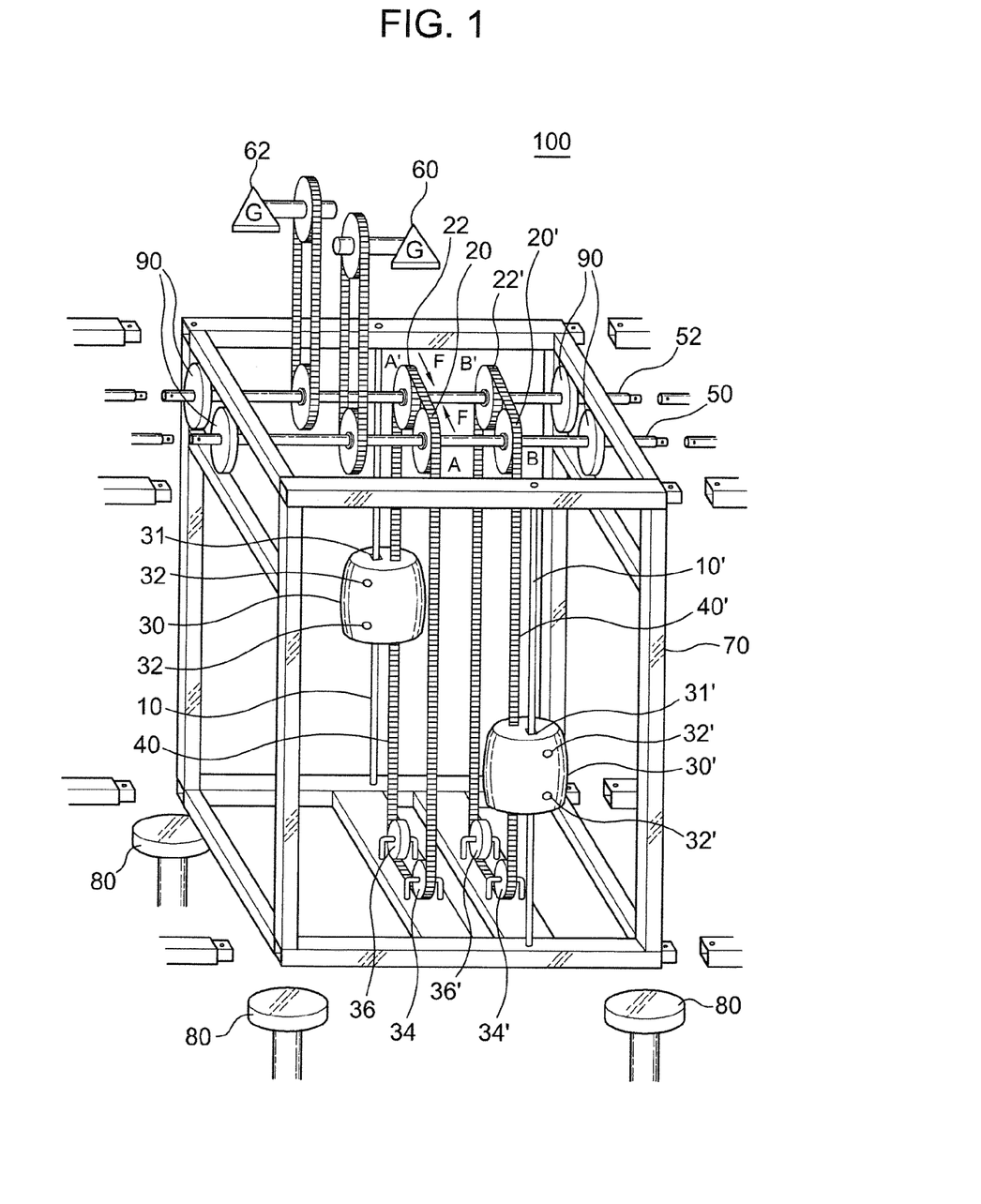
FIG. 1 is a perspective view showing a water wave power plant system according to an embodiment of the present invention.
Figure 2:
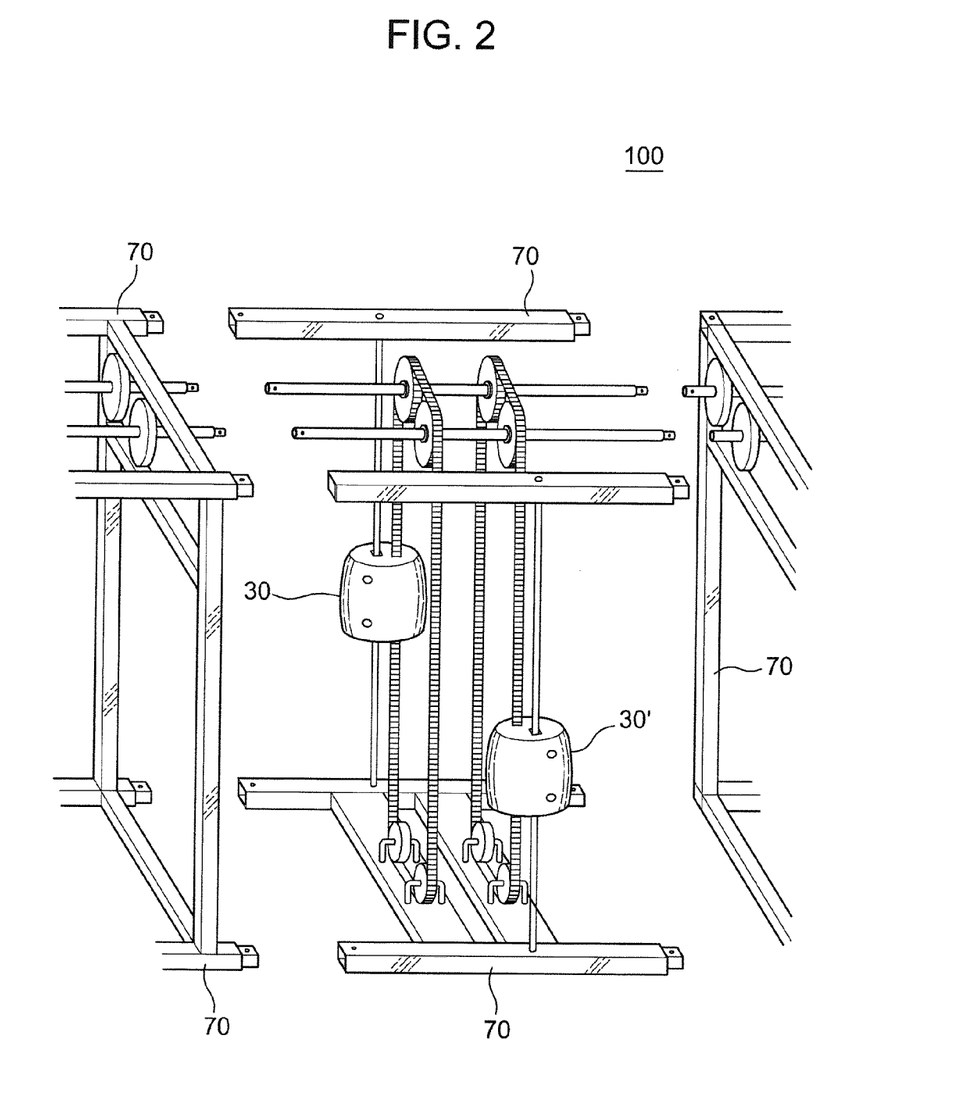
FIG. 2 is a perspective view showing a water wave power plant system according to another embodiment of the present invention.
Figure 3:
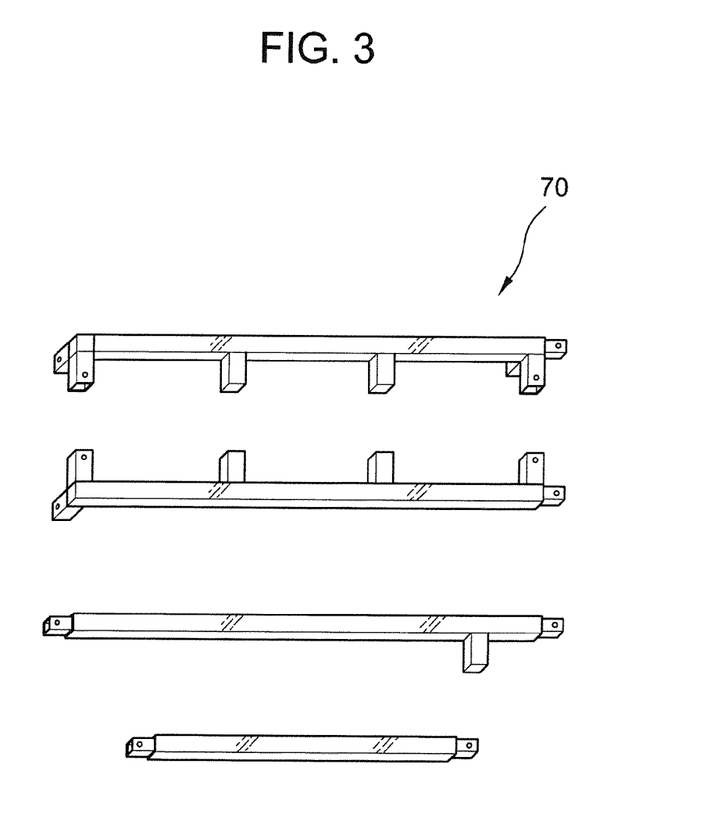
FIG. 3 is a perspective view showing parts of a supporting frame according to an embodiment of the invention.
Figure 4:
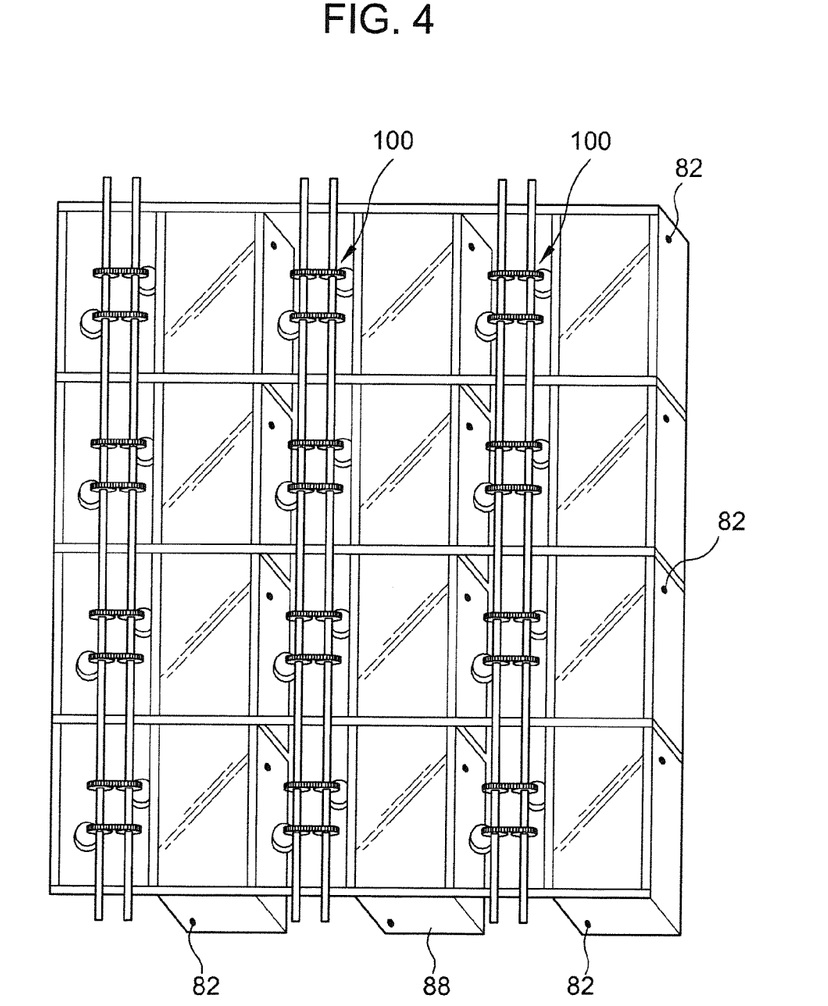
FIG. 4 is a perspective top view of a water wave power plant system installed on a floating platform.

FIGS. 1-3 show a water wave power plant system 100 according to an embodiment of the present invention. FIG. 4 shows a water wave power plant system 100 installed on a floating platform according to another embodiment of the invention.

An aspect of the invention provides the water wave power plant system 100.

The water wave power plant system 100 comprises:

a first guide rail 10 extending vertically;

a first clockwise freewheel 20 disposed at a top position;

a first counterclockwise freewheel 22 disposed at the top position and on a first plane same as the first clockwise freewheel 20;

a first buoy 30 having a through-hole 31, wherein the first buoy 30 is queued through the through-hole 31 by the first guide rail 10 and movement of the first buoy 30 is restricted to be along the first guide rail 10;

a first right roller 34 aligned vertically with the first clockwise freewheel 20 and disposed at a bottom position;

a first left roller 36 aligned vertically with the first counterclockwise freewheel 22 and disposed at the bottom position;

a first chain belt 40 having a first end connected to a top portion of the first buoy 30 and a second end connected to a bottom portion of the first buoy 30, wherein the first chain belt 40 engages the first clockwise freewheel 20, the first counterclockwise freewheel 22, the first right roller 34, and the first left roller 36 on the first plane;

a second guide rail 10' extending vertically;

a second clockwise freewheel 20' disposed at the top position;

a second counterclockwise freewheel 22' disposed at the top position and on a second plane same as the second clockwise freewheel 20';

a second buoy 30' having a through-hole 31', wherein the second buoy is queued through the through-hole 31' by the second guide rail 10' and movement of the second buoy 30' is restricted to be along the second guide rail 10';

a second right roller 34' aligned vertically with the second clockwise freewheel 20' and disposed at the bottom position;

a second left roller 36' aligned vertically with the second counterclockwise freewheel 22' and disposed at the bottom position;

a second chain belt 40' having a first end connected to a top portion of the second buoy 30' and a second end connected to a bottom portion of the second buoy 30', wherein the second chain belt 40' engages the second clockwise freewheel 20', the second counterclockwise freewheel 22', the second right roller 34', and the second left roller 36' on the second plane;

a clockwise shaft 50 engaging the first and second clockwise freewheels 20, 20';

a counterclockwise shaft 52 engaging the first and second counterclockwise freewheels 22, 22';

a first generator 60 engaging the clockwise shaft 50; and a second generator 62 engaging the counterclockwise shaft 52.

The first buoy 30 and the second buoy 30' are disposed on the first chain belt 40 and the second chain belt 40' respectively, such that the first and second buoys 30, 30' move oppositely from each other by a water wave.

Figure 5:
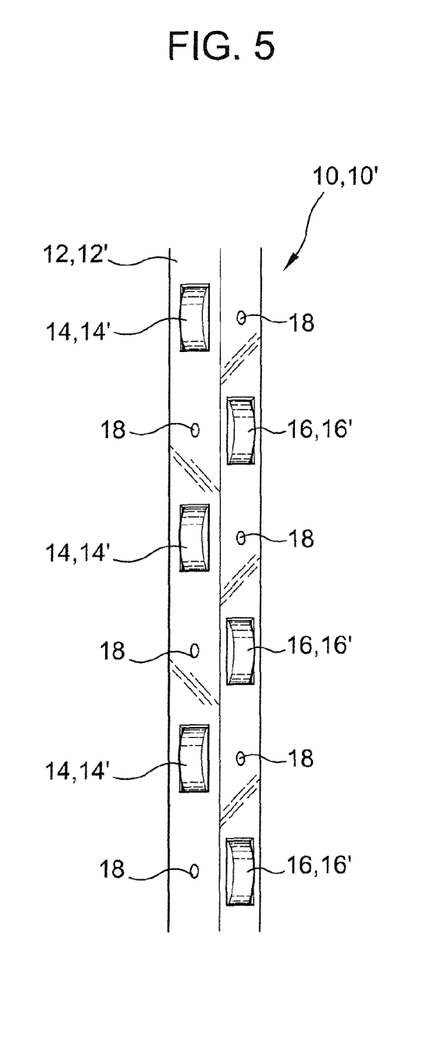
FIG. 5 is a perspective view of a guide rail according to another embodiment of the invention.
Figure 6:
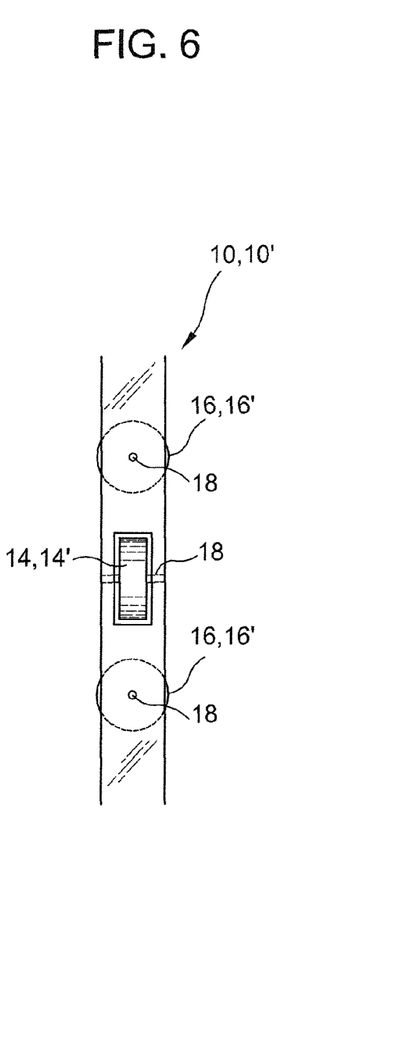
FIG. 6 is a side plan view showing the guide rail of FIG. 5.

As shown in FIGS. 5 and 6, the first guide rail 10 comprises a first rectangular tube 12, a plurality of first embedded-rollers 14 installed in the first rectangular tube 12 rotatably with two partial portions exposed on first two parallel outer wall of the first rectangular tube 12, and a plurality of second embedded-rollers 16 installed in the first rectangular tube 12 rotatably with two partial portions exposed on second two parallel outer walls of the first rectangular tube 12, and the first embedded-rollers 14 and the second embedded-rollers 16 are disposed perpendicularly with respect to each other.

Likewise, the second guide rail 10' comprises a second rectangular tube 12', a plurality of third embedded-rollers 14' installed in the second rectangular tube rotatably with two partial portions exposed on first two parallel outer walls of the second rectangular tube, and a plurality of fourth embedded-rollers 16' installed in the second rectangular tube 12' rotatably with two partial portions exposed on second two parallel outer walls of the second rectangular tube 12', and the third embedded-rollers 14' and the fourth embedded-rollers 16' are disposed perpendicularly with respect to each other.

The first and second embedded-rollers 14, 16 of the first rectangular tube roll on the inner surface of the through-hole 31 and facilitate substantially frictionless movement of the first buoy 30 along the first guide rail 10.

The third and fourth embedded-rollers 14, 16 of the second rectangular tube roll on the inner surface of the through-hole 31' and facilitate substantially frictionless movement of the second buoy 30' along the second guide rail 10'.

Each of the first and second rectangular tubes 12 may have a square cross-section and the through-hole 31, 31' has a square cross-section.

Each of the first through fourth rollers 14, 16 may engage the corresponding rectangular tube 12 through an axle 18 fixed to two parallel outer walls perpendicular to the two parallel outer walls through which the corresponding embedded-rollers 14, 16 are exposed as shown in FIGS. 5 and 6.

The clockwise freewheels 20, 20' may be configured to engage the corresponding clockwise shaft 50 for a clockwise rotation, and the counterclockwise freewheels 22, 22' may be configured to engage the corresponding counterclockwise shaft 52 for a counterclockwise rotation.

The clockwise freewheels 20, 20' may be configured to disengage the corresponding clockwise shaft 50 for a counterclockwise rotation, and the counterclockwise freewheels 22, 22' may be configured to disengage the corresponding counterclockwise shaft 52 for a clockwise rotation.

Each of the freewheels 20, 20', 22, 22' may comprise a ratchet device.

Each of the freewheels 20, 20', 22, 22' may comprise a plurality of spring-loaded steel rollers inside a driven cylinder.

Each of the first and second buoys 30, 30' may comprise a container provided in the buoys 30, 30' for keeping water of a predetermined amount inside.

The predetermined amount may be determined to make the buoy 30, 30' operate in a desired way.

The water wave power plant system may further comprise a stopcock 32, 32' for blocking an opening to the container.

Each of the first guide rail 10 and the second guide rail 10' may have an angular cross-section, such that the corresponding buoy 30, 30' is guided along without rotating around the guide rail 10, 10'.

The angular cross-section may comprise a triangle, a pentagon, a hexagon, and a quadrangle. Therefore, in certain embodiments of the invention, the guide rail 10, 10' may be a flat band of metal.

The water wave power plant system 100 may further comprise a supporting frame 70 for anchoring the guide rails 10, 10', the shafts 50, 52, and the right and left rollers 34, 34', 36, 36'.

The water wave power plant system 100 may further comprise a plurality of bearings 90 for allowing the shafts 50, 52 rotate freely while constrained against the supporting frame 70.

The water wave power plant system 100 may further comprise a platform 80 fixed to a floor of ocean for installing the supporting frame 70.

The water wave power plant system 100 may further comprise a floating platform 88 for installing the supporting frame 70 as shown in FIG. 4.

The floating platform 88 may comprise a barge, which comprises a water container (inside the floating platform 88) with a stopcock 82. Like the buoy 30, 30', the water container of the barge 88 can be loaded with water to optimize the condition for the operation of the system 100.

In certain embodiments of the invention, the system 100 may include more buoys and associated other elements for expanding the structure to tap more of the wave energy as shown in FIG. 2.

Figure 7:
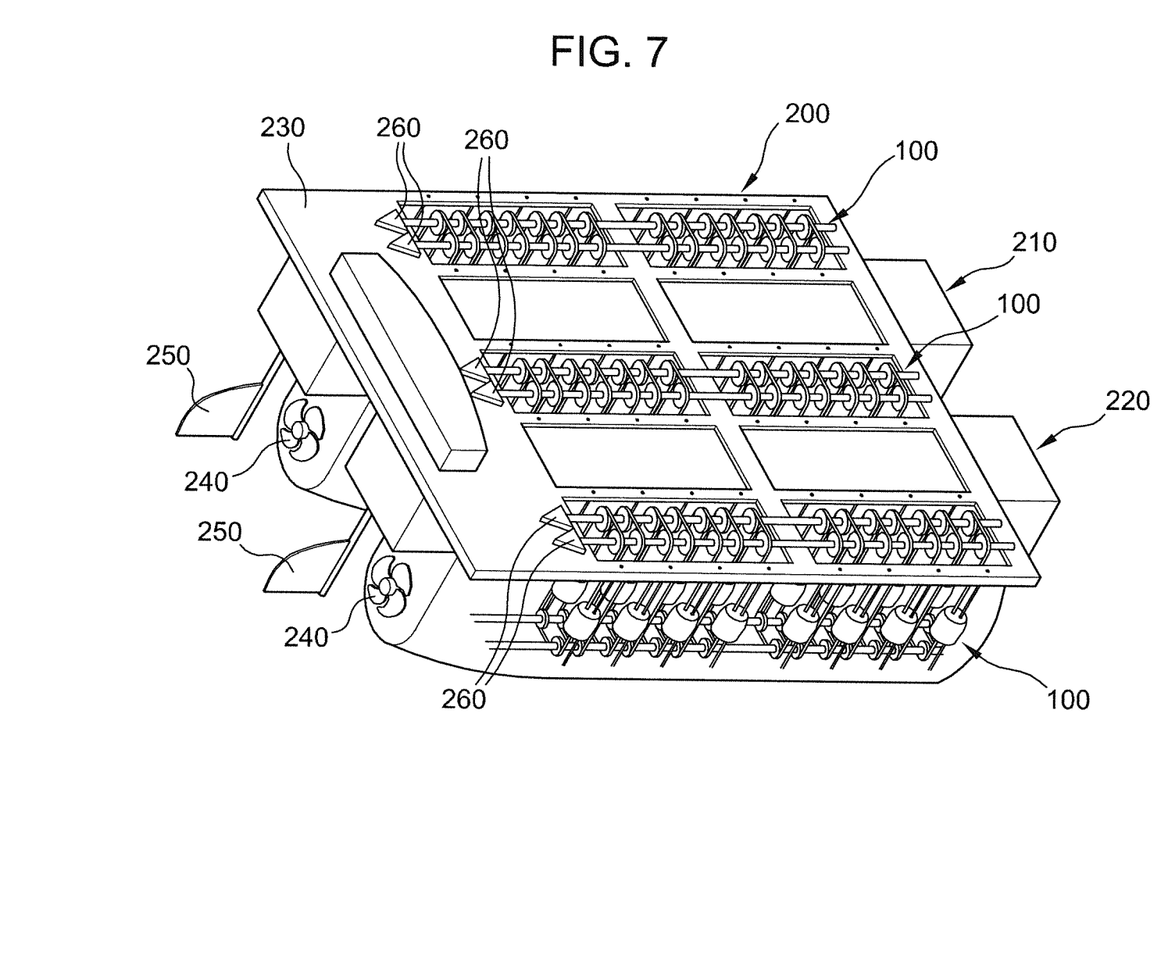
FIG. 7 is a perspective view showing a self-propelling ship according to still another embodiment of the invention.

According to another aspect of the invention, a self-propelling ship 200 comprises:

a first boat 210 installed with a plurality of first water wave power plant systems 100;

a second boat 220 installed with a plurality of second water wave power plant systems 100;

a connecting deck 230 for covering and connecting the first and second boats with an interval inbetween;

a plurality of propellers 240 operated by motors (not shown) powered by electrical power generated by generators 260 of the plurality of first and second water wave power systems 100; and a plurality of rudders 250, wherein the self-propelling ship 200 navigates from construction dock to a destination, wherein the destination includes a site for wave power plant or wherever electrical power is needed.

FIG. 2 is a perspective view showing a water wave power plant system according to another embodiment of the present invention. In certain embodiment of the invention, the structure in FIG. 1 can by combined with the structure in FIG. 2, building a bigger structure.

FIG. 3 is a perspective view showing parts of a supporting frame according to an embodiment of the invention. However, the frame 70 may be constructed with other materials, for example, such as cylindrical poles.

FIG. 4 is a perspective top view of a water wave power plant system installed on a floating platform. In certain embodiments of the invention, a plurality of the water wave power plant system 100 may be installed on a big barge structure. Then, the buoys 30, 30' move up and down relative to the relatively heavy and stationary barge structure.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A water wave power plant system comprising:
a first guide rail extending vertically, comprising a first rectangular tube, a plurality of first embedded-rollers installed in the first rectangular tube rotatably with two partial portions exposed on first two parallel outer wall of the first rectangular tube, and a plurality of second embedded-rollers installed in the first rectangular tube rotatably with two partial portions exposed on second two parallel outer walls of the first rectangular tube, wherein the first embedded-rollers and the second embedded-rollers are disposed perpendicularly with respect to each other;
a first clockwise freewheel disposed at a top position;
a first counterclockwise freewheel disposed at the top position and on a first plane same as the first clockwise freewheel;
a first buoy having a through-hole, wherein the first buoy is queued through the through-hole by the first guide rail and movement of the first buoy is restricted to be along the first guide rail;
a first right roller aligned vertically with the first clockwise freewheel and disposed at a bottom position;
a first left roller aligned vertically with the first counterclockwise freewheel and disposed at the bottom position;
a first chain belt having a first end connected to a top portion of the first buoy and a second end connected to a bottom portion of the first buoy, wherein the first chain belt engages the first clockwise freewheel, the first counterclockwise freewheel, the first right roller, and the first left roller on the first plane;
a second guide rail extending vertically, comprising a second rectangular tube, a plurality of third embedded-rollers installed in the second rectangular tube rotatably with two partial portions exposed on first two parallel outer walls of the second rectangular tube, and a plurality of fourth embedded-rollers installed in the second rectangular tube rotatably with two partial portions exposed on second two parallel outer walls of the second rectangular tube, wherein the third embedded-rollers and the fourth embedded-rollers are disposed perpendicularly with respect to each other;
a second clockwise freewheel disposed at the top position;
a second counterclockwise freewheel disposed at the top position and on a second plane same as the second clockwise freewheel;
a second buoy having a through-hole, wherein the second buoy is queued through the through-hole by the second guide rail and movement of the second buoy is restricted to be along the second guide rail;
a second right roller aligned vertically with the second clockwise freewheel and disposed at the bottom position;
a second left roller aligned vertically with the second counterclockwise freewheel and disposed at the bottom position;
a second chain belt having a first end connected to a top portion of the second buoy and a second end connected to a bottom portion of the second buoy, wherein the second chain belt engages the second clockwise freewheel, the second counterclockwise freewheel, the second right roller, and the second left roller on the second plane;
a clockwise shaft engaging the first and second clockwise freewheels;
a counterclockwise shaft engaging the first and second counterclockwise freewheels;
a first generator engaging the clockwise shaft; and
a second generator engaging the counterclockwise shaft,
wherein the first buoy and the second buoy are disposed on the first chain belt and the second chain belt, such that the first and the second buoy move oppositely from each other by a water wave,
wherein the first and second embedded-rollers of the first rectangular tube roll on the inner surface of the through-hole and facilitate substantially frictionless movement of the first buoy along the first guide rail,
wherein the third and fourth embedded-rollers of the second rectangular tube roll on the inner surface of the through-hole and facilitate substantially frictionless movement of the second buoy along the second guide rail.

2. The water wave power plant system of claim 1, wherein each of the first and second rectangular tubes has a square cross-section and the through-hole has a square cross-section.

3. The water wave power plant system of claim 1, wherein each of the first through fourth rollers engages the corresponding rectangular tube through an axle fixed to two parallel outer walls perpendicular to the two parallel outer walls through which the corresponding embedded-rollers are exposed.

4. The water wave power plant system of claim 1, wherein the clockwise freewheels are configured to engage the corresponding clockwise shaft for a clockwise rotation, and wherein the counterclockwise freewheels are configured to engage the corresponding counterclockwise shaft for a counterclockwise rotation.

5. The water wave power plant system of claim 4, wherein the clockwise freewheels are configured to disengage the corresponding clockwise shaft for a counterclockwise rotation, and wherein the counterclockwise freewheels are configured to disengage the corresponding counterclockwise shaft for a clockwise rotation.

6. The water wave power plant system of claim 1, wherein each of the freewheels comprises a ratchet device.

7. The water wave power plant system of claim 1, wherein each of the freewheels comprises a plurality of spring-loaded steel rollers inside a driven cylinder.

8. The water wave power plant system of claim 1, wherein each of the first and second buoys comprises a container for keeping water of a predetermined amount inside.

9. The water wave power plant system of claim 8, wherein the predetermined amount is determined to make the buoy operate in a desired way.

10. The water wave power plant system of claim 8, further comprising a stopcock for blocking an opening to the container.

11. The water wave power plant system of claim 1, further comprising a supporting frame for anchoring the guide rails, the shafts, and the right and left rollers.

12. The water wave power plant system of claim 11, further comprising a plurality of bearings for allowing the shafts rotate freely while constrained against the supporting frame.

13. The water wave power plant system of claim 11, further comprising a platform fixed to a floor of ocean for installing the supporting frame.

14. The water wave power plant system of claim 11, further comprising a floating platform for installing the supporting frame.

15. The water wave power plant system of claim 14, wherein the floating platform comprises a barge, and wherein the barge comprises a water container with a stopcock.

16. A self-propelling ship comprising:
- a first boat installed with a plurality of first water wave power plant systems according to claim 1;
- a second boat installed with a plurality of second water wave power plant systems according to claim 1;
- a connecting deck for covering and connecting the first and second boats with an interval inbetween;
- a plurality of propellers operated by motors powered by electrical power generated by generators of the plurality of first and second water wave power systems; and
- a plurality of rudders,
- wherein the self-propelling ship navigates from construction dock to a destination, wherein the destination includes a site for wave power plant.

* * * * *